United States Patent [19]

Lung et al.

[11] Patent Number: 4,711,146

[45] Date of Patent: Dec. 8, 1987

[54] METHOD FOR REPROFILING PROFILES OF WHEEL SETS

[75] Inventors: Dieter Lung, Herzogenrath; Werner Kluft, Aachen; Jochen Fabry, Rückersdorf; Helmut Wittkopp; Theodor Dombrowski, both of Erkelenz; Hartwig Klosterhalfen, Düren, all of Fed. Rep. of Germany

[73] Assignee: W. Hegenscheidt GmbH, Erkelenz, Fed. Rep. of Germany

[21] Appl. No.: 27,994

[22] Filed: Mar. 17, 1987

Related U.S. Application Data

[63] Continuation of Ser. No. 732,440, May 9, 1985, abandoned.

[30] Foreign Application Priority Data

May 10, 1984 [EP] European Pat. Off. ........ 84105312.7
Mar. 22, 1985 [EP] European Pat. Off. ........ 85103378.7

[51] Int. Cl.$^4$ ............................................. B23B 5/28
[52] U.S. Cl. ............................................. 82/1 C; 82/8; 82/14 A
[58] Field of Search ............... 82/1 C, 8, 4 E, 14 R, 82/14 A

[56] References Cited

U.S. PATENT DOCUMENTS 4,119,001 10/1978 Wittkopp et al. .................... 82/8
4,200,012 4/1980 Wittkopp et al. .................... 82/8
4,265,149 5/1981 Wittkopp et al. .................... 82/8

FOREIGN PATENT DOCUMENTS 1889680 3/1984 Fed. Rep. of Germany .

OTHER PUBLICATIONS

Sandvik Coromant Catalogue 1982, Tools for Wheel Set Machining.
Glaser's Annals 90 (1966) NL 9 Sept., pp. 316-326.
Feldmuhle SPK-Werkzeuge catalogue 7/1981.

*Primary Examiner*—Nicholas P. Godici
*Assistant Examiner*—Jerry Kearns
*Attorney, Agent, or Firm*—Herbert L. Lerner; Laurence A. Greenberg

[57] ABSTRACT

Conventional methods for reprofiling profiles of wheel sets by lathe machining predominantly produce continuous chips which interfere with the operating process, which can cause damage to the machine and which require continuous attention on the part of the operating personnel. The production of short fragmented chips through the use of suitable cutting edge geometry is impossible because of the continuous change of the cutting data during the reprofiling of such work pieces. In order to eliminate this problem, the profile is faced off or turned through the alternating use of hard-metal cutting materials and heavy-duty cutting materials and by adapting the cutting data to the cutting material then in use, wherein the heavy-duty cutting material is used in those profile regions in which a shock or sudden load on the cutting material is not expected, while the hard-metal cutting materials are used in the remaining regions. However, it is also possible to initially examine the wheels of the wheel set with regard to the presence of spots that would subject the lathe tools to a sudden shock or load; the examination results then determine the tools that are to be used as well as the cutting characteristics or data.

3 Claims, 19 Drawing Figures

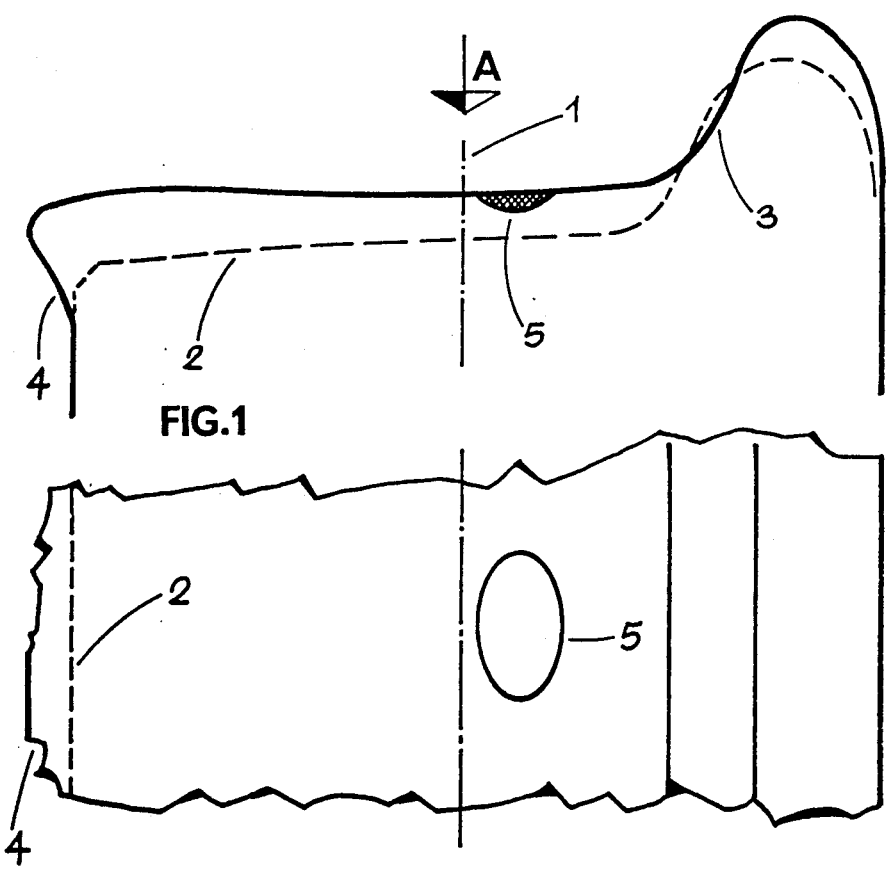
FIG.1
FIG.2
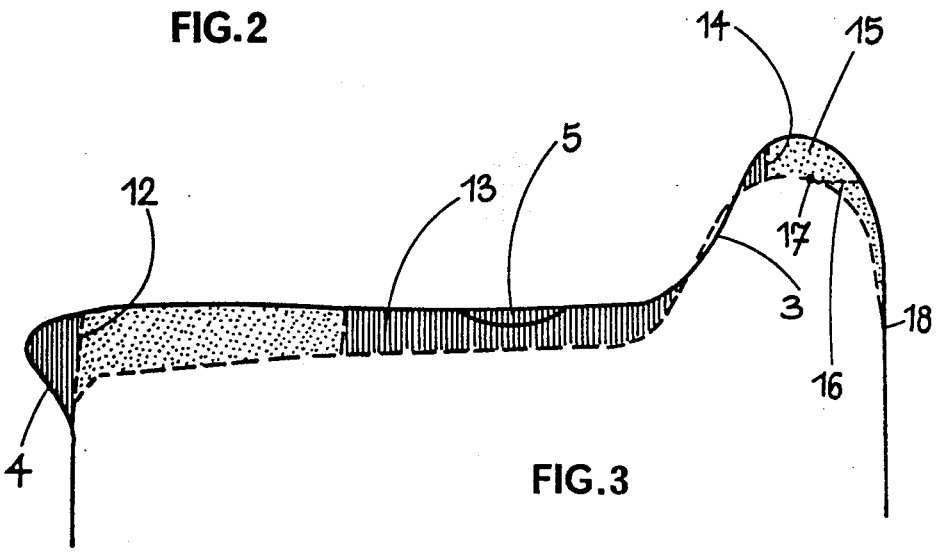
FIG.3

METHOD FOR REPROFILING PROFILES OF WHEEL SETS

This application is a continuation, of application Ser. No. 732,440, filed May 9, 1985, now abandoned.

The invention relates to a method for reprofiling profiles of wheel sets by machining with a lathe. This form of reprofiling of the profiles of wheel sets has been known for a long time and has found acceptance throughout the world. Hard metals may be used in this case as cutting materials, with which it has become possible to reprofile the profiles of the wheels of a wheel set in a rather short time and with great accuracy.

However, the above-described lathe machining is disadvantageous because predominantly long continuous chips are produced which interfere with the machining process, which can cause damage to the machine and which require the continuous attention of the operator. In addition, the removal of the continuous chips produced during the reprofiling presents difficulties.

Another method of this chip removal by machining for reprofiling the profiles of wheel sets, is carried out by milling the profiles with rotating milling cutters. This form of machining has the advantage of producing only short chips, so that the problems related to continuous chips are eliminated thereby. However, such machining by milling has the disadvantage that it takes a great deal of time, is generally not accurate enough and generates a reprofiled surface which can only be measured with difficulty.

Because of the economic disadvantages, milling has not found worldwide acceptance to the same extent as lathe machining, for reprofiling the profiles of wheel sets.

In the field of reprofiling of profiles of wheel sets by lathe machining, it has furthermore become known from German Published, Non-Prosecuted Application No., DE-OS 27 13 997 corresponding to U.S. Pat. No. 4,265,199 to work with different tools in different profile regions of the wheels of the wheel sets to be reprofiled. The difference between the tools resides in their cutting edge geometry. The change in the cutting edge geometry on one hand serves for adaptation to the geometry of the profile region to be reprofiled, and on the other hand, for adaptation to different material hardnesses occurring in the overall profile region. In the profile region of the wheels of wheel sets, flats and hard spots occur which are locally very narrowly limited and therefore exert a shock or sudden load on the inserted hard-metal cutting plate during one pass. Such hard-metal cutting plates as well as conventional cutting materials can withstand this shock or sudden load. However, it must also be possible to cut through welded beads from repair welds, for instance, in vicinity of the lateral surface of the rim or wheel flange. This, too, is possible with the cutting materials mentioned above.

In addition, a rather large and severe degree of peening very frequently occurs in vicinity of the outer end face of a wheel which also represents a large stress for such cutting materials, but is controllable by the cutting materials.

Heavy-duty or high-powered cutting materials such as oxide ceramic are also known, which permit the use of a cutting speed considerably higher than with hard-metal cutting materials in a chip-producing process However, these heavy-duty cutting materials are shock-sensitive and can therefore only be used for continuous operation. However, if the operation is continuous, then they allow considerable higher operating speeds than the conventional hard-metal cutting materials. If heavy-duty cutting materials are used, considerable savings of time are achieved as compared to when hard-metal cutting materials are used. Heavy-duty cutting materials are therefore used where savings of time as well as a high surface quality is to be achieved.

The problem of continuous chip formation during the reprofiling of profiles of wheel sets by lathe machining is therefore unresolved.

It is accordingly an object of the invention to provide a method for reprofiling profiles of wheel sets, which overcomes the hereinafore-mentioned disadvantages of the heretofore-known devices of this general type, and to make it possible to obtain short fragmental chips in the lathe machining of the profiles of wheel sets that have been running.

With the foregoing and other objects in view there is provided, in accordance with the invention, a method for reprofiling profiles of wheel sets by machining with a lathe using cutting data, such as the cutting and feeding velocity, which comprises subdividing the profile of the wheel sets into regions where cutting materials are not expected to be subjected to a shock or sudden load and remaining regions, alternatingly turning or facing off the profile using heavy-duty or high-powered cutting materials at the regions of the profile where a shock or sudden load is not expected and using shock-insensitive or insusceptible cutting materials at the remaining regions, and adapting the cutting data to the cutting material being used at each moment.

This combined use of conventional shock-insensitive cutting materials and heavy-duty or high-powered cutting materials such as oxide ceramic makes it possible to combine the strengths of the two cutting materials with each other and at the same time to eliminate the weaknesses of the two cutting materals. The use of the heavy-duty cutting material in profile regions in which shock stresses are not expected and which therefore have a relatively uniformly distributed hardness and which stress the cutting material relatively uniformly, permit machining with chipping or cutting data typical for such heavy-duty cutting materials, so that short fragmental chips can be produced. Continuous chips can be prevented with certainty if such heavy-duty cutting materials and the correct choice of the cutting data are used. These heavy-duty cutting materials would be destroyed, however, in those profile regions in which a shock or sudden load occurs. They are therefore replaced in those profile regions by shock-insensitive or shock-insusceptible hard-metal cutting materials, such as the conventional hard-metal cutting materials, which then in turn are used with different cutting or chipping data. The shock stress can be triggered, for instance, by hard spots, flats or even by welded seams or burrs. These requirements are met by the hard-metal cutting materials mentioned above as an example. The above-described condition of the material in the above-mentioned regions simultaneously provides for at least relatively short chips, even if shock-insensitive cutting materials are used, so that at least relatively short fragmental chips are produced, even in this region.

In accordance with another mode of the invention, there is provided a method which comprises checking the profile region for the presence and arrangement of spots causing shock or sudden loads before or during machining with the lathe, and assigning tools or cutting materials to different regions of the profile and selecting and adjusting cutting data based upon the results of the checking step. With this measure it is possible to produce fragmental chips over the entire profile due to the alternating use of heavy-duty cutting materials and shock-insensitive cutting materials, and it is possible at the same time to optimize the work by delineating the respective profile region, in which the respective cutting materials are to be used.

In accordance with a further mode of the invention, there is provided a method which comprises subdividing an individual profile into a region where cutting materials are expected to be subjected to a shock or sudden load, at least frequently, and other regions, continuously using the shock-insensitive cutting materials at the regions of the profile where a shock or sudden load is expected independently of the actual condition of the regions, and continuously using the heavy-duty cutting materials at the other regions. Depending on their regular use, the wheel sets which run in a given track exhibit very definite wear characteristics and a very definite distribution of such spots which generate a shock or sudden stress which stresses the cutting material. These properties are known from experience and can therefore simply be assumed as such. In this case, a corresponding check of the state of the material of the wheel set can be omitted.

In accordance with an added mode of the invention, there is provided a method which comprises providing the cutting material with a cutting edge and a chip guiding or controlling stage, determining the machining requirements of the regions of the profile to be machined with the cutting materials, and adapting the geometry or shape of the cutting edge and the chip guiding or controlling stage of the chip-producing or machining conditions or requirements of the profile. This permits the optimization of the chip fracture, the surface quality and the time required. Admittedly, this necessitates the use of cutting chips of different geometries, at least for the shock-insensitive cutting materials. The cutting edge geometry of the cutting materials is adapted to the respective machining requirements of the profile region, in which they are to be used.

In accordance with an additional mode of the invention, there is provided a method for reprofiling profiles of wheel sets by machining with a lathe using cutting data, which comprises examining the wheels of the wheel sets before or during machining for the presence of spots which would subject lathe tools to a shock or sudden load, determining cutting data specific to the profile, using the results of the examination step for subsequently choosing the lathe tools, working the entire profile with shock-insusceptible or insensitive cutting materials or lathe tools when spots are present which would subject the lathe tools to a shock or sudden load, and working the entire profile with high-powered or heavy-duty cutting materials or lathe tools while using cutting data specific to the respective profile when spots which would subject the lathe tools to a shock or sudden load are not present.

In this way, it is also possible to put heavy-duty cutting materials such as oxide ceramic to use, if the wheels of the wheel sets do not show any spots in the region to be reprofiled that would destroy these cutting materials. Therefore, such cutting materials that permit a chip production that is at least satisfactory for the corresponding application are always put to use depending on the condition of the wheels of a wheel set to be reprofiled. When heavy-duty cutting materials are used, the time spent for reprofiling is shortened additionally. Therefore, better chip production and better economy are achieved.

Other features which are considered as characteristic for the invention are set forth in the appended claims.

Although the invention is illustrated and described herein as embodied in a method for reprofiling profiles of wheel sets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a fragmentary, diagrammatic, cross-sectional view of a wheel for a tire with roll-over or lapping and a so-called black spot at the running surface;

FIG. 2 is a top-plan view taken along the direction of the arrow A according to FIG. 1;

FIG. 3 is a view similar to FIG. 1, including a cutting sequence performed with the method according to the invention;

Figures 4, 5, 6:
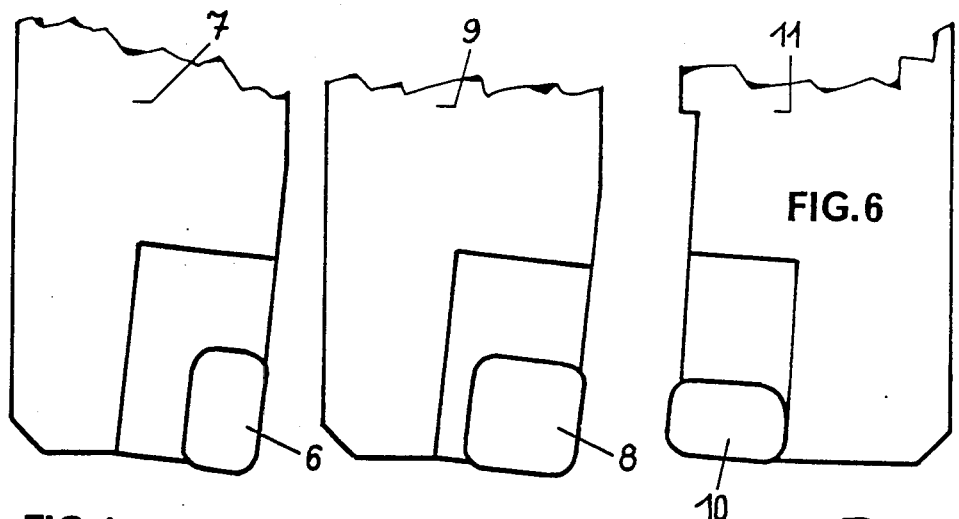
FIGS. 4-6 are similar fragmentary elevational views of machining tools.

Referring now to the figures of the drawings and first, particularly to FIG. 1 thereof, there is seen a cross section of a wear profile of a running wheel set shown by a thick, solid line. In order to generate a correct profile, the wear profile must be chipped away or machined down to the broken line profile shown in FIG. 1, which represents a new profile 2. In order to achieve the reconstruction of the new profile 2 with a minimum of chip removal or machining, only enough machining is carried out in a conventional manner that the new profile 2 is exactly tangent to the wear profile. This tangent is kept so close that a so-called black spot 3 remains as the rest of the wear profile.

As shown in FIG. 2, a burr 4 with a ragged edge is produced at the outer edge of the wear profile by frequent rolling-over or lapping.

The dot-dash line 1 represents the plane of a measuring circle, the position of which is fixed relative to every profile. The diameter of a wheel is determined in this measuring-circle plane.

Hard spots 5 can occur in vicinity of this measuring-circle plane 1, as is shown in FIG. 2. The hard spots 5 are very limited locally, as a rule. The hard spot may be followed by a non-illustrated flat spot, for instance, caused by locked brakes. The material in vicinity of such a flat spot is also hard. However, the sudden shape irregularity caused by a flat spot must also be considered because it increases stress acting on the cutting tools.

In order to perform the method according to the invention, the overall profile must be subdivided into profile regions which are macChined on one hand by cutting materials that are not susceptible or insensitive to shock and on the other hand by heavy-duty or high-powered cutting materials. An example of such a subdivision is shown in FIG. 3. The tools used in each case are shown in FIGS. 4 to 6.

The profile of a wheel which is shown in FIG. 3 has a burr 4 which is machined by a tool plate 8 fastened on a holder 9, as seen in FIG. 5. The tool or cutting plate 8 is formed of tough, hard metal because the burr is hard and has a ragged edge as seen in FIG. 2, and thereby generates an interrupted cut. The cutting material is therefore subjected to a sudden or shock load, so that it must be insusceptible to shock or shock-insensitive.

The cut performed with the tool plate 8 is completed if the cutting edge of the tool plate 8 has arrived at the outer planar surface 12 of the wheel, which is not specifically designated. At this point, the tool is changed. Similarly, the cutting speed and the feed are changed at this point. A cutting plate 6 which is formed of oxide ceramic and which is fastened to a holder 7 as seen in FIG. 4, is then brought into engagement in direction toward a wheel flange shown in broken lines in FIG. 3. Naturally, the cutting plate 6 need not absolutely be formed of oxide ceramic, but may instead be formed of other heavy-duty or high-powered cutting materials with comparable properties.

The cut performed with the cutting plate 6 is terminated if the cutting edge of the cutting plate has reached the region 13, in which hard spots 5 may be located, as known from experience. In this region 13, the cutting or tool plate 8 is used again, which is capable of withstanding the shock or sudden stress occurring at the hard spot 5. Due to the remaining black spot 3 and the build-up or deposit that may be present in vicinity of the lateral surface of the wheel flange and the shock or sudden stress for the tool resulting therefrom, the cut performed with the cutting plate 8 must be continued up to the region 14 of the profile. In the following region 15 which is stippled in FIG. 3, the oxide ceramic cutting plate 6 is employed again, since only cold-deformed material is still present in this region. However, it nevertheless becomes necessary to change tools at the line 16 due to the geometric conditions at the profile. The line 16 is a tangent at the point 17. The cutting plate 10 which is disposed on the holder 11, is used for this purpose. The cutting plate 10 can again be a heavy-duty or high-powered cutting material such as oxide ceramic. With it, the profile can be machined up to the point 18.

The subdivision of the cut which is performed, for instance, as shown in FIG. 3, can be used in principle for any worn wheel set. Then, heavy-duty or high-powered cutting materials and cutting materials which are insensitive or insusceptible to shock would logically be alternatingly used, and predominantly short fragmental or segmented chips could be produced by suitable matching of the cut data.

Figure 7:
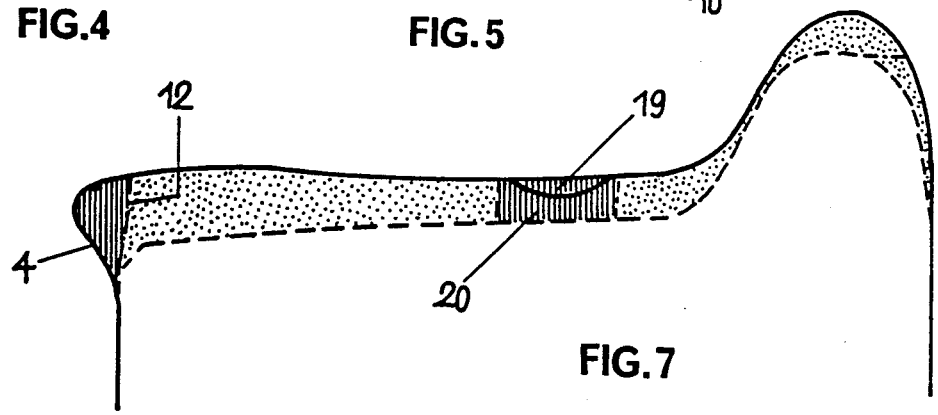
FIG. 7 is a view similar to FIG. 3, but with a different cutting sequence.

An optimization of the cut subdivision is possible with modified machining and prior testing of the wheel set to be reprofiled, such as is shown for an individual case in FIG. 7. However, knowledge of the condition of the wheel set is necessary for optimizing the cut subdivision. Hard spots must first be determined. These can be determined, for instance, by applying a hardness tester which is based on vibration to the spots on the profile which are known from experience to have hard spots, while the wheel set is rotating. Furthermore, the presence of burrs must be determined, which is possible by simple visual inspection. The same applies to checking for weld bands. Additionally, the presence and location of so-called black spots must be determined, which can be done, for instance, on a conventional measuring bench.

It will be assumed that during the above-described check, a wheel condition was found such as is shown in FIG. 7. It can be seen immediately that the burr 4 must be machined with hard-metal cutting materials up to the vicinity of the outer planar surface 12. The adjacent stippled region can then be faced off with heavy-duty cutting materials such as oxide ceramic. This region is brought very close to a hard spot 19, having a region 20 which must now be machined again through the use of hard-metal cutting material and the associated cutting data. After the region 20 is machined, the remaining machining of the profile according to FIG. 7 must be cacried out again with a heavy-duty cutting material.

Figure 8:
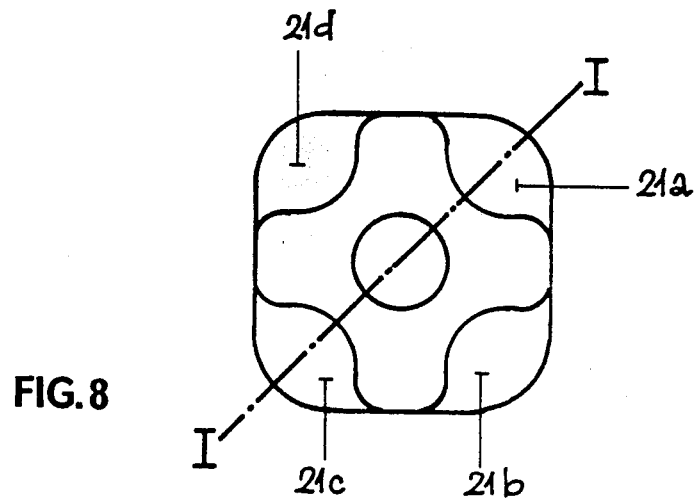
FIG. 8 is an elevational view of a cutting plate for small cutting depths.
Figure 9:
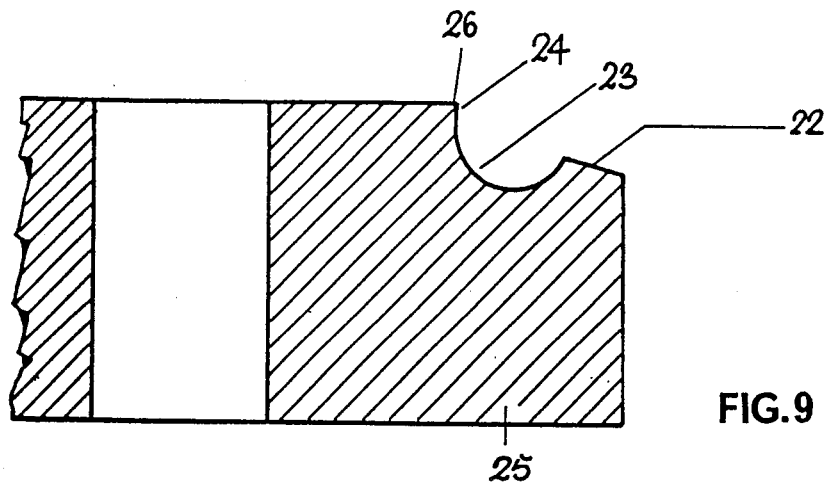
FIG. 9 is a cross-sectional view taken along the line I—I in FIG. 8.
Figure 10:
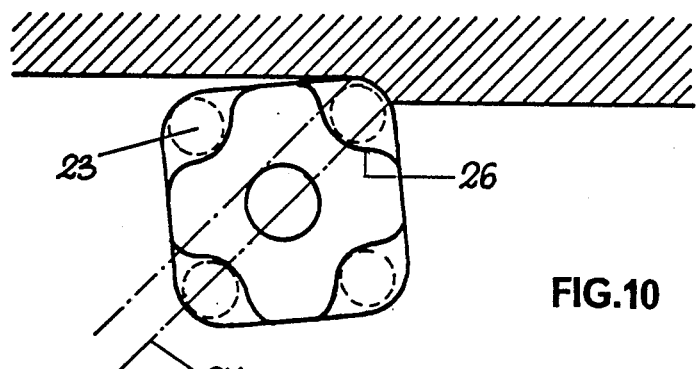
FIG. 10 is a partially cross-sectional view of a cutting plate according to FIG. 8 in the operating position.
Figures 11, 12:
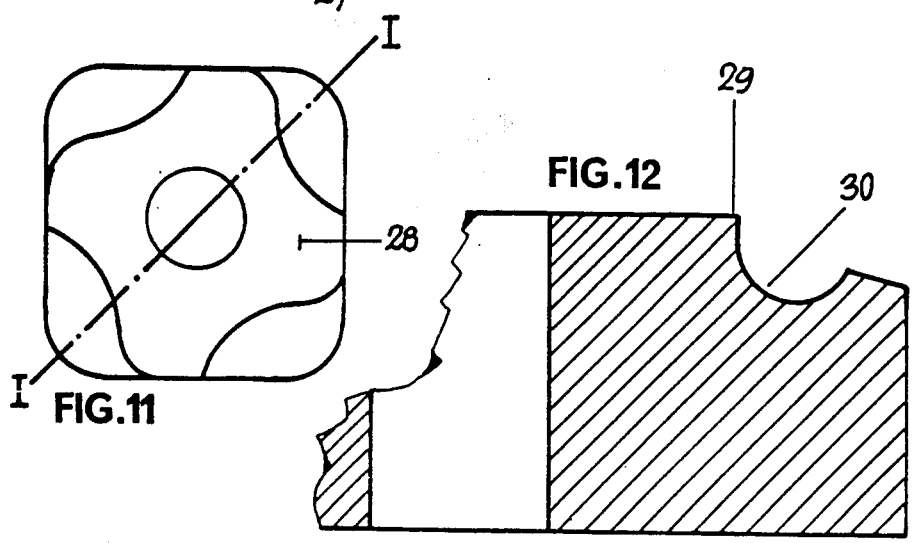
FIG. 11 is a view similar to FIG. 8 of a cutting plate for a range of cutting depths adjacent the range of cutting depths provided by the cutting plate according to FIG. 8.
FIG. 12 is a cross-sectional view taken along the line II—II in FIG. 11.
Figure 13:
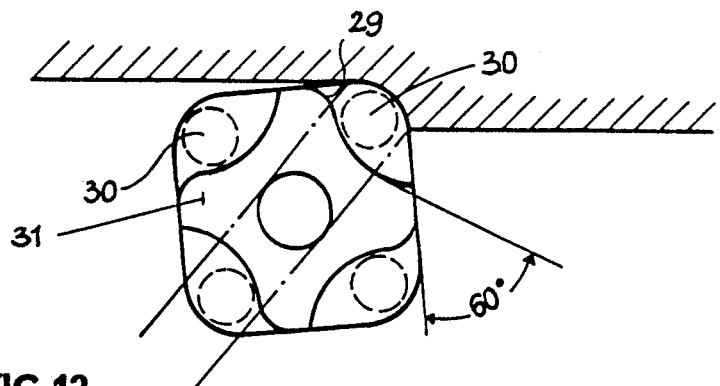
FIG. 13 is a view similar to FIG. 10 of a cutting plate according to FIG. 11 in the operating position.

If an examination shows that no areas are present that exert a shock or sudden load, then the entire reprofiling can be done on the corresponding wheel with shock-insensitive or shock-insusceptible cutting materials, such as with conventional hard metals. In order to optimize all of the operating conditions, such as machining the burr 4 and machining the profile region 20, it may be entirely sensible to use hard metal cutting plates with different cutting edge geometry for adaptation to the respective operating range. Similar considerations also apply to the different regions to be machined with heavy-duty cutting materials, which are stippled in FIG. 7. This also applies to a cut subdivision according to the embodiment of FIG. 3. In order to obtain short, fragmented or segmented chips all under operating conditions, it is necessary to use a suitable geometric shape of the cutting plate, besides suitable data for the cutting velocity and the feed velocity. This is particularly important when shock-insensitive or insusceptible cutting materials are used. The greatest problem in this case is that although cutting plates are available in enough reliable geometric shapes they always result in a short fragmented or segmented chip only in a given cutting depth region. When reprofiling the wheels of wheel sets, this cutting depth region is subjected to large variations in the direction of the profile and continually changing conditions for the chip fragmentation apply. It therefore makes particularly good sense to subdivide the chip depth region into several smaller regions, in which case these smaller regions can be managed by a special respective cutting plate. For instance, a chip or a cutting depth region of 8 mm, which occurs in the measuring circle plane 1, is subdivided into three ranges, namely 0 to 2 mm, 2 to 4 mm and 4 to 8 mm. For each of these ranges, a separate cutting plate is provided which has the same geometric shape but is shaped differently as far as the chip conducting surfaces and the chip-breaking surfaces are concerned, depending on the purpose. For the range from 0 to 2 mm, a cutting plate according to FIGS. 8, 9, and 10 can be provided. The plate is a square plate with four cutting edges (21a, 21b, 21c, 21d), which can be used selectably. With this cutting plate, the chip area or face starts with a narrow phase 22, then changes into a tray or depression 23 which ends in a steep wall 24, several millimeters high. The lower surface 25 of this plate is flat. The tray 23 is disposed approximately sperically around the center of the rounded edges. The chip-breaking edge 26 adapts itself to the back edge of the tray 23 and approaches the cutting edges at right angels. The dot-dash lines 27 in FIG. 10 represent the runoff of the chips. A hard-metal cutting plate 28 shown in FIG. 11 is provided for the cutting depth range of 2 to 4 mm. The geometric relationships are the same as for the tools according to FIGS. 8 to 10, but the chip-breaking edge 29 has a different shape. The chip-breaking edge 29 is tagent to the outer rim of the tray 30. On one hand, the edge 29 approaches the secondary cutting edge and on the other hand it approaches the main cutting edge in an arc. The radius of the arc is larger than the radius of the tray 30, so that the angle between the main cutting edge and the chip-breaking edge 29 is about 60°. A chip discharge or run off 31 is self-adjusted as shown in FIG. 13.

Figure 14:
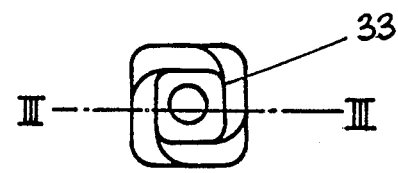
FIG. 14 is an elevational view of a cutting plate for the range of cutting depths adjacent the operating region of the cutting plate according to FIG. 11.
Figure 15:
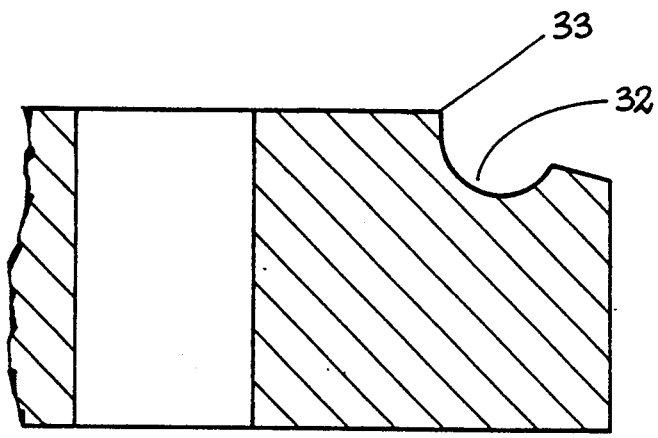
FIG. 15 is a cross-sectional view taken along the line III—III in FIG. 14.
Figure 16:
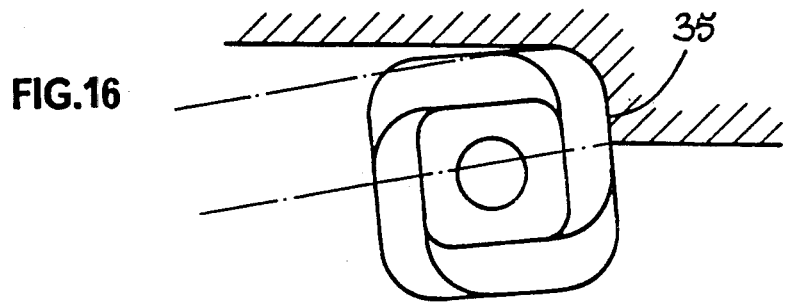
FIG. 16 is a view similar to FIGS. 10 and 13 of a cutting plate according to FIG. 14 in the operating position.

A cutting plate such as is shown in FIGS. 14 to 16, is employed for cutting depths up to 8 mm. The geometric relationships are again the same as for the cutting plates according to FIGS. 11 to 13. However, the chip-breaking edge 33 and the tray or depression 32 have a different shape. They are parallel to the rounded edges and to the main cutting edge 35, and they start at the rounded edges and end approximately 2 mm behind the region of maximum cutting depth. A flow of chips 34 is then self-adjusted as shown in FIG. 16.

Figure 17:
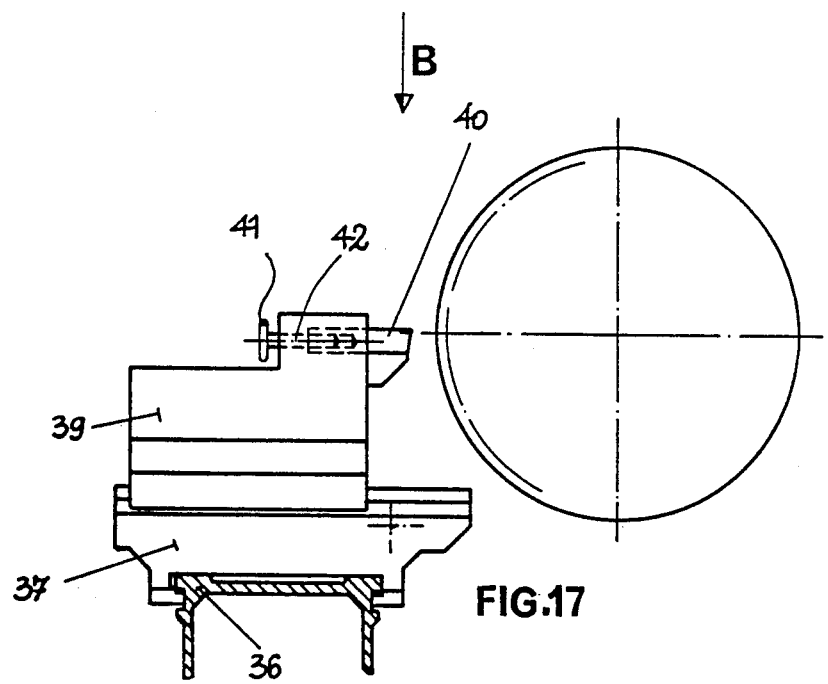
FIG. 17 is a partially cross-sectional side-elevational view of a duplicating support.
Figure 18:
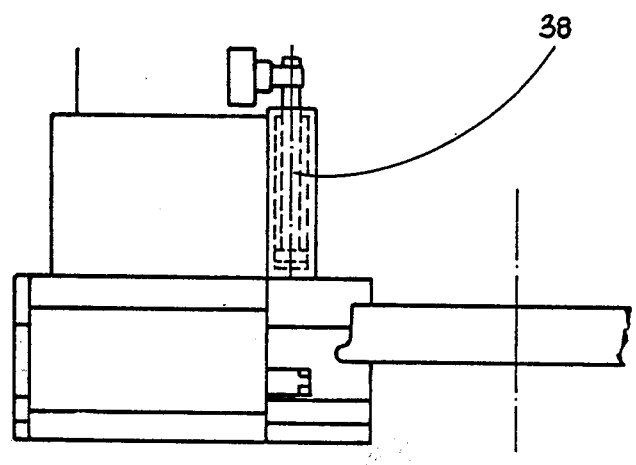
FIG. 18 is a top-plan view taken along the direction of the arrow B in FIG. 17.
Figure 19:
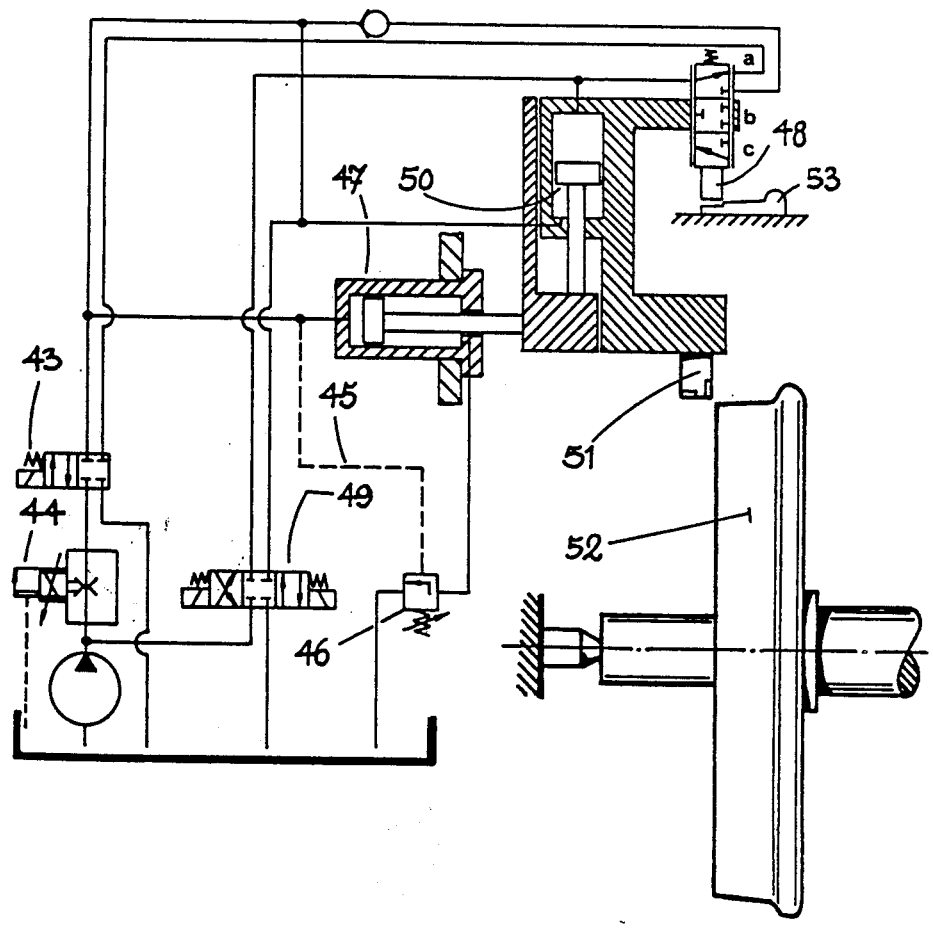
FIG. 19 is a fragmentary diagrammatic and schematic hydraulic circuit diagram for a duplicating support according to FIG. 17.

FIGS. 17 and 18 show the basic construction of a support suitable for the desired reprofiling. A longitudinal carriage 37 which can be moved by a cylinder 38, slides on longitudinal or elongated guideways 36 of a machine bed which is not specifically designated. A planar carriage 39 on which a tool head 40 is disposed, slides on the longitudinal carriage 37. The tool head 40 is interchageably fastened. The tool head 40 can be clamped, for instance, by a hand wheel 41 and a spindle 42. The tool head 40 can be a commercially available tool system, and hydraulic, electrical or mechanical clamping devices can be used. The tool head 40 can be interchanged automatically in this case with a tool changer or it may simply be changed by hand. It is also possible to accomodate the tool head or an individual tool in a revolving head and, for instance, to firmly install a part of the tools firmly on the support and to interchangeably fasten another part. Likewise, the support carrying the tools or the tool system can be controlled hydraulically, electrically, or numerically as desired. The embodiment shows a support with a hydraulic duplicating control which can be used for the intended application. The associated circuit diagram is shown in FIG. 19. The interaction between a facing, planar or cross-fed cylinder 50 and a longitudinal cylinder 47 is controlled by a conventional duplicating feeder 48. The feed is switched on by operating a valve 43. In this process, the amount of feed oil is determined by a flow valve 44. Due to spring pressure, the feeder 48 is in a position "a" and the oil flows into a space 50 in the facing cylinder, causing the tool 51 to move toward the wheel 52. The feeder 48 moves into a position "b" if it strikes a template 53. In this way, pressure builds up in a line 45 so that a pretensioning valve 46 opens and the longitudinal cylinder 47 starts a longitudinal feed. This longitudinal motion brings the feeler 48 into the position "a" or "c", depending on the inclination of the profile of the template 53. This produces a pressure drop in the line 45, causing the motion of the longitudinal cylinder 47 to be stopped by closing the pretensioning valve 46, and oil is admitted to the space 50 of the facing cylinder.

In order to change a tool, the feed is switched off by a new switching operation of the valve 43, through which the valve is switched into the position shown. It is then necessary to wait for one revolution of the wheel set, so that the cutting edges of the tool can cut themselves loose. Through an appropriate control of the valve 49, the cross slide is retracted for the tool change. The reverse operation of the valve 49 brings the tool back into operating position. In this case, the operating position is checked by the feeler 48 so that the tool again comes into engagement at the exactly correct point.

With the process according to the invention, it is possible for the first time to suitably use heavy-duty or high-powered cutting devices for the reprofiling of wheels of wheel sets, and to thereby achieve an improved chip production even in previously problematic regions, and to save time in the process.

We claim:

1. Method for reprofiling profiles of wheel sets by machining with a lathe using cutting data, which comprises providing cutting data specific to the profile with a machine control unit (43-50), visually subdividing the profile of the wheel sets into regions where cutting materials are not expected to be subjected to a sudden load and remaining regions, rotating the wheel sets, reprofiling the wheel sets by alternating machining the profile using heavy-duty cutting materials at the regions of the profile where a sudden load is not expected and using shock-insensitive cutting materials at the remaining regions, and adapting the cutting data to the cutting material being used at each moment with the machine control unit (43-50).

2. Method according to claim 1, which comprises visually checking the profile for the presence and lateral arrangement of spots on the profile causing sudden loads in order to define lateral sections of sudden load, machining the profile by rotating the wheel sets while changing the cutting material just before reaching and after leaving the lateral sections of sudden load.

3. Method according to claim 1, which comprises providing the machine control unit (43-50) with cutting data of an individual profile (53) subdivided into regions where cutting materials are expected to be subjected to a sudden load and other regions machining the profile by rotating the wheel sets while continuously using the shock-insensitive cutting materials at the regions of the profile where a sudden load is expected independently of the actual condition of the regions, and continuously using the heavy-duty cutting materials at the other regions.

* * * * *